United States Patent [19]
Wuenschel

[11] 3,876,971
[45] Apr. 8, 1975

[54] PRECISION SEISMOLOGY
[75] Inventor: Paul C. Wuenschel, Glenshaw, Pa.
[73] Assignee: Gulf Research & Development Company, Pittsburgh, Pa.
[22] Filed: Sept. 28, 1973
[21] Appl. No.: 401,700

Related U.S. Application Data
[63] Continuation-in-part of Ser. No. 227,985, Feb. 22, 1972, abandoned.

[52] U.S. Cl.......... 340/15.5 BH; 181/102; 181/106; 166/285
[51] Int. Cl............................................. G01v 1/40
[58] Field of Search .................. 340/15, 15.5 BH; 73/DIG. 6; 181/.5 P, 102, 106; 166/285, 212

[56] References Cited
UNITED STATES PATENTS
2,788,510   4/1957   Howes ...................... 340/15.5 MC
2,792,067   5/1957   Peterson ................... 340/15.5 MC
3,208,549   9/1965   Alexander et al. ......... 340/15.5 BH
3,693,717   9/1972   Wurnschel .................... 166/285

FOREIGN PATENTS OR APPLICATIONS
737,606   6/1966   Canada..................... 340/15.5 BH Primary Examiner—Maynard R. Wilbur
Assistant Examiner—N. Moskowitz

[57] ABSTRACT

An improved overall seismic system in which a reproducible seismic source is located below the near surface inhomogeneous layers. A vertical traverse is made in a borehole below the near surface inhomogeneous layers. A detector is located at a desired location in the borehole clamped in position and tested before the seismic source is actuated.

5 Claims, 1 Drawing Figure

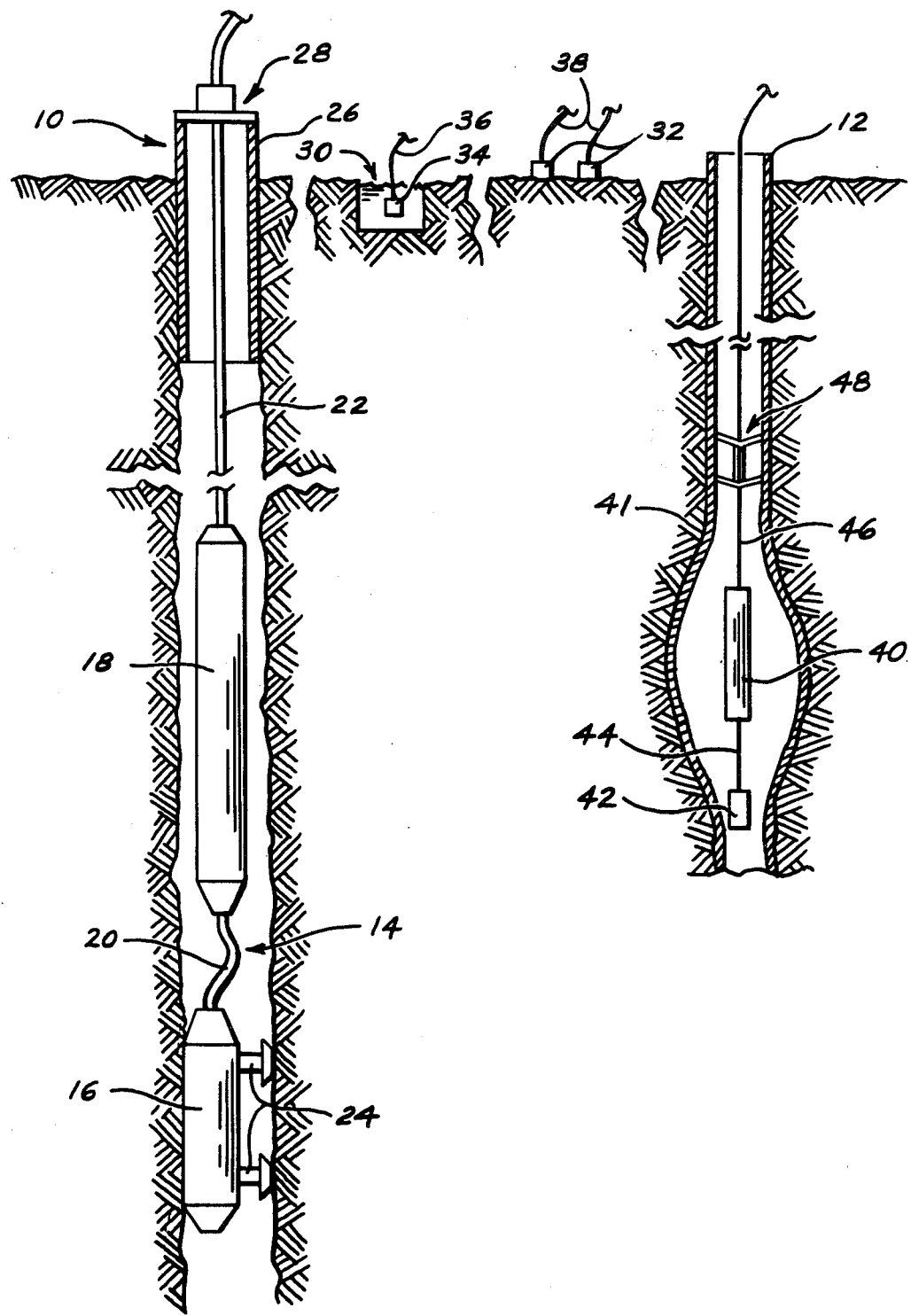

PRECISION SEISMOLOGY

This application is a continuation-in-part of my application Ser. No. 227,985, filed Feb. 22, 1972, entitled "Precision Seismology," now abandoned.

This invention relates to geophysical exploration and more particularly to a seismic method of exploration.

In conventional seismic exploration, a shot hole is drilled and explosives placed therein. A relatively large array of surface detectors is placed in predetermined patterns and at predetermined distances from the shot hole, the shot is fired, and the energy returned through the earth from the deep strata of interest is recorded by the detectors. The problems in conventional seismic exploration methods which are solved by this invention depend upon making a vertical traverse of the detectors and positioning the detectors below the near surface inhomogeneous layers and in the most usable locations in the borehole. A reproducible shot hole used in this invention locates the source of the seismic waves below the near surface inhomogeneous and weathered layers. Thus, both the shot and the detector are below the near surface inhomogeneous and weathered layers thus significantly improving the signal to noise ratio, reducing the absolute amount of noise, improving the frequency bandwidth of the returned signal, and generally producing better quality results. As is known, the weathered layer is the uppermost part of the near surface inhomogeneous layers of the crust of the earth which, because it is subject to the weather, man, and other disruptive forces, is not homogeneous in its ability to pass seismic vibrations and thus detracts from the quality of such vibrations received at surface detectors.

In conventional seismic exploration methods, the shot hole, or at least the part of the hole where the shot is detonated, is destroyed, so that a shallower lever in the same hole must be used, or a new hole must be drilled for the next shot, if a repeat shot is desired. It would be very much preferred to have the ability to fire many charges from one hole at the same depth, with assurance that the waves produced will be substantially the same from shot to shot, while moving a much smaller array of detectors with respect to the area to be explored. The reproducible shot hole used in the present invention permits such repeated reproducible shots at the same level in the same hole.

An important feature of the present invention is the ability to make a vertical traverse of the detector in combination with repeatedly shooting from the reproducible source. The advantages of this ability over conventional seismic methods, in summary, are improved control over signal to noise ratio by varying the depth of the vertical traverse below the near surface inhomogeneous and weathered layers, an increase in bandwidth of the reflected signal permitting enhancement of the resolving power of the reflection seismograph, a direct measure of the pulse radiated by the seismic source, a measure of any bubble pulses or "ghost" reflections in the near surface ao that their distortion of the desired reflected signal can be removed, and a measure of the near surface reflection of the primary reflected signal that permits the removal of "near surface induced deep multiples" from the total reflected signal to leave only the primary reflected signal. Thus, the vector seismic field is precisely measured by the present invention to achieve these improvements.

The integrated seismic exploration system of the invention is a successful combination of some new concepts and some concepts which have been partially examined by others, into a single successfully working system which achieves its substantial improvements, as set forth herein.

The overall invention system is novel. However, the use of vertical arrays per se is not new in observational seismology, but the quality of the results from earlier efforts have left much to be desired. Vertical strings of detectors measuring the source generated acoustic pressure fluctuations in the borehole fluid and similar configurations of detectors measuring particle velocity of the borehole fluid have been shown to be seriously perturbed by the tube wave propagating in the borehole fluid especially where the borehole diameter is variable or where the borehole intersects geological formations of varying elastic parameters. Cementing strings of detectors in the same configuration is difficult and expensive and produces varying quality results. Clamping devices such as locking arm devices and bow spring clamps have given only sporadically good results, but are unpredictable and inconsistent, especially in boreholes where the diameter is variable. The present invention overcomes these drawbacks by using only one detector unit, accurately measuring the borehole diameter with a conventional caliper log, selecting the proper depths from this log for clamping the detector, using a clamping system whose clamping force is independent of borehole diameter, and determining the clamped condition prior to recording the seismic signal so that corrections for the differences in the clamped condition from one detector depth to another can be made. The invention can record a vertical traverse of any desired length, at any desired detector spacing, and positioned at any desired depth below the near surface inhomogeneous layers.

United States patents disclosing prior art processes for seismic exploration of interest to this invention are U.S. Pat. Nos.

3,354,983 Erickson et al
3,564,914 Desai et al
3,371,310 Silverman
2,792,067 Peterson
2,788,051 Howes
3,426,865 Henry
3,542,150 Youmans et al
3,526,874 Schwartz The advantages of this invention will be pointed out or will become evident in the following detailed description and claims, and in the accompanying drawing also forming a part of the disclosure, in which the sole figure is a diagrammatic representation of a system embodying the invention emplaced in the earth.

Referring now in detail to the drawing, 10 generally designates a detector hole and 12 generally indicates a reproducible shot hole. Located in hole 10 is a clamped detector assembly 14 which consists of a lower unit 16, an upper unit 18, a composite cable 20 interconnecting the upper and lower units, and a multiple cable 22 connected to the upper end of the upper unit 18. Lower unit 16 carries a pair of hydraulic pistons 24 whereby the lower unit may be clamped in the hole 10. The mechanism for operating the pistons is located in the upper unit 18. An operative embodiment of a clamped detector suitable for use in this invention is fully disclosed in application Ser. No. 255,229 of C. A. Gustavson, E. B. Shutes, and Paul C. Wuenschel filed May 19, 1972 entitled Clamped Detector now U.S. Pat No.

3,777,814. Insofar as such additional disclosure may be necessary to complete the disclosure of this application, the specification of the above-identified "Clamped Detector" patent application is incorporated herein by reference as if it were here set forth in full. The invention is not limited, however, to use solely with that apparatus, but may be used with any other equivalent means. It is important that the detector be capable of being clamped in place in the borehole, tested, used to obtain seismic data, released, and then moved vertically to a new location in the hole 10 for use in obtaining data for a vertical traverse of the detector hole. After the detector assembly is clamped in the hole, testing is accomplished by driving an oscillator to vibrate in a vertical direction and measuring the response of the vertical detector followed by vibrating in a horizontal direction and measuring the response in the horizontal detectors to determine if the signal from the detectors in adequate. Apparatus for such testing as well as the clamping and releasing is disclosed in said application Ser. No. 255,229.

The upper end of detector hole 10 is cased by means of a surface pipe 26 secured to the upper end of the hole in any suitable manner. A cable slacking device 28 is located at the upper end of the casing 26, and cooperates with cable 22 in the manner set forth below. Reference may be had to a copending patent application, Ser. No. 256,780, of C. A. Gustavson, E. B. Shutes, and P. C. Wuenschel, filed May 25, 1972, entitled Device for "Gripping and Imparting Slack in a Cable," and now Pat. No. 3,791,612, for a full detailed disclosure of an operative embodiment of a slacking tool which can be used in the present invention. Insofar as such additional disclosure may be needed to complete the disclosure of the present invention, the specification of that co-pending patent application is incorporated herein by reference as if it were set forth herein in full. The invention is not limited, however, to use solely with that slacking tool, but may be used with any other equivalent means.

Fairly closely adjacent detector hole 10 is located a reproducible cap shot hole 30 and a pair of conventional seismic detectors 32. Only two detectors are shown to simplify the drawing. In practice, any number, depending upon the complexity of the near surface conditions, can be used. Typically, nine detectors have been used in field testing the invention. In those tests of the invention, the reproducible cap shot hole 30 comprised simply a water filled drum set in a suitably formed hole in which a detonating cap 34 attached to an electrical firing wire 36 was located. The line 38 from each of the surface detectors 32, along with the end of cable 22 and the firing line 36, lead to the usual utility or recording truck used in seismic field work. Apparatus such as the typical wire line equipment for moving detector 14 in its hole 10 will of course be required.

The reproducible shot hole 12 will normally be located a substantial distance from the detector hole 10 and may comprise an explosive charge 40 connected to a weight 42 by means of a cable 44 useful in lowering the assemblage down the hole 12. Hole 12 is lined as at 41, as set forth in detail in my U.S. Pat. No. 3,693,717, entitled "Reproducible Shot Hole" which issued Sept. 26, 1972. The shot 40 is fired from the surface via a cable 46 which also connects the parts 40, 42 and 44 to centralizing means 48 to hold the charge 40 centered in the hole 12. Reference may be had to the above-identified patent, entitled "Reproducible Shot Hole" for a fully detailed description of one operative embodiment of a reproducible shot hole which may be used in the system of the present invention. Insofar as such additional disclosure may be needed to complete the disclosure of the present invention, the specification of that patent is incorporated herein by reference as if it were set forth herein in full. The invention is not limited, however, to use solely with that reproducible shot hole, but may be used with any other equivalent means. As developed in U.S. Pat. No. 3,693,717, the specific materials used in lining the hole at the shot area and the manner of mounting the lining in the hole are material, for any particular type of surrounding formation, in obtaining a true reproducing source.

Shot hole 12 should be filled with a liquid, such as water or drilling mud to enhance the transfer of energy from the explosive charge to the earth. The detector hole 10 can be filled with any fluid, including liquids and air or other gases.

As an indication of orders of magnitude, the holes 10 and 12 may be several hundreds of feet apart, the distance between the detector hole 10 and the reproducible cap shot hole 30 may be about 30 feet, and the distance between the detector hole 10 and the surface detectors 32 can be any convenient separation such as 500 to 1500 feet to insure that the first arriving signal at the detectors follows a critically refracted path along the subweathered competent layers.

OPERATION

As is conventional in geophysical exploration, the location which is to be seismically explored is first determined with the use of more coarse exploration tools, such as airborne magnetometer surveys, ground gravity surveys, surface geological mapping, and conventional seismic reflection surveys. It is thought that the present invention will have particular utility where conventional seismic exploration has been unsuccessful. Early preparatory steps to use this invention are to drill the shot hole 12 through the near surface inhomogeneous and weathered layers and to emplace the liner 41 therein as taught, for example, in U.S. Pat. No. 3,693,717. Next, the detector hole 10 is drilled. The length of this hole will depend upon the thickness of the weathered layer, it being necessary that the lower detector unit 16 be below the weathered layer and the near surface inhomogeneous layer. Since the weathered layer averages less than a few hundred feet, and the depths to be explored average many thousands of feet, usually down to the "basement", the detector hole and shot hole 12 must extend below the near surface inhomogeneous and weathered layers, but otherwise their depths are not critical. Detector holes as deep as 4000 feet can be advantageously used and there is no reason deeper holes cannot be used if such holes are available. In geology, the basement is the bottom of the sedimentary rock layers. In summary, both the charges 40 and the clamped detector 16 will be below the weathered and near surface inhomogeneous layers.

Another preparatory step is the building or making of the reproducible cap shot hole 30. As mentioned above, this may simply be a water-filled barrel or drum set into the ground. A small cap 34 is set off for each detector depth during a traverse and for each seismic reflection shot in order to obtain a value for the so-called "section velocity." This parameter is well known in geophysical exploration, and, very briefly, comprises the average elastic wave velocity of the section being explored, and is later used in processing the final data in order to make the normal move out correction. The weathered and near surface inhomogeneous layers are not a problem during this operation because the section velocity over the region to be traversed only is desired, and therefore the effect of the near surface inhomogeneous layer on the energy from these cap shots is a constant.

Another preliminary step is the placement of the surface seismic detectors 32. These detectors 32 monitor each shot from the reproducible shot hole 12 and cap shot hole 30 in order to check that these shots are indeed reproducing both in timing and in magnitude, and to produce data which is later used for normalizing purposes. To the extent the source is not uniform from shot to shot, the data recorded at detectors 32 is used to correct the data recorded by the devices in lower unit 16 so that the data produced by detector unit 16 will be as it would have been had the shots been in fact the same from one to the next.

These steps of firing caps 34 in hole 30 to detector 16 and monitoring the shots at 32 have separate utility for measuring the section velocity over the vertical traverse to a high degree of precision not heretofore possible. The reason for this precision is the reproducibility of the cap shots 34 in combination with the ability of detector 16 to measure ground motion without any influence thereon by the detectors as a result of the testing which allows correction of the detectors, and further in combination with known cross-correlation type of data processing. This is an important advantage over the prior art, in that such prior methods require a liquid filled detector hole and the detector 16 of the invention can operate with the very much less expensive air filled detector hole.

The fact that the signals recorded at 32 pass through the weathered layer does not adversely affect this advantageous result because both the detectors 32 and the charges 40 are throughout at the same physical locations, and thus the signal, though distorted by its passage through the weathered and near surface inhomogeneous layers, serves the purpose as sketched out because changes from shot to shot appear very clearly.

The next step comprises calipering the detector hole 10 in order to determine the regions which are to proper gauge so that the detector unit 16 will be properly clamped. The next step comprises running the clamped detector assembly 14 into the hole 10 to the region determined by the caliper log at which the unit 16 will be located.

The unit 16 is then clamped in position, and some slack is provided in the composite cable 20 interconnecting the upper and lower units 18 and 16, so that the lower detector unit 16 is isolated and thus will be responsive to only seismic vibrations received by it from the earth and not by any stray forces it might receive via cable 22 and the upper unit 18. To this end, the slacking means 28 are operated, as set forth, for example, in co-pending patent application, Ser. No. 256,780, to drop the upper unit 18 slightly with respect to the now-clamped lower unit 16. Then, measurements are made of the detector couple to insure that the detector is properly coupled to the borehole. Means are provided in the clamped detector described in patent application Ser. No. 255,229 to check the quality of the clamp prior to shooting. If the clamp is found to be improper for any reason, then the pistons 24 are drawn back into lower unit 16, the entire device 14 moved a short distance vertically in the hole 10, and another attempt made to achieve a proper clamp. Once clamped and ready to work, the checking measurement gives the so-called "driving point impedance," which is used for later removing the effect of the detector "plant" (detector couple in the present invention ) from the data finally produced. The shot 40 is then fired in the reproducible shot hole 12.

The above steps of clamping, releasing cable tension, and measuring the driving point impedance, and even calipering if necessary, is repeated each time the clamped detector 14 is moved in the hole 10 in making a vertical traverse.

The length of the traverse and the length of the interval between stops during the traverse will be determined by the field geologist dependent upon the particular conditions in the area such as the depth of the near surface inhomogeneous layers of which the surface weathered layer is only a part, magnitude and frequency content of the noise scattered by the near surface layers, and frequency content of the reflected signal desired for the solution of the geological problem. Similarly, the number of shots to be fired to the detector at each detector stop during the vertical traverse will be determined by the field geologist depending upon the specific conditions, consideration being given to the magnitude and character of the background seismic noise that is not generated by the shot.

As an indication of orders of magnitude, during tests run during the development of the invention, the detector was traversed through an interval of about 1000 feet, was clamped 51 times during that interval, 153 shots in all were fired, and the average was three shots per detector location.

The data produced by each of the shots fired to the detector at each clamped position are summed, so that all random noise in the time zone of interest, i.e., the deep strata being explored, is removed, and a more true picture of the reflected signal from these strata remains.

An important advantage of the invention is that the bandwidth of the energy returned from the deeper strata of interest is increased over the results possible with conventional seismology. The steps of the invention which enhance this desirable improvement include the use of relatively small charges to produce higher frequencies as set forth in our U.S. Pat. No. 3,693,717, incorporation of the driving point impedance information, and the relatively long length of traverse with frequent detector stops.

The above steps complete the method of the invention as to the making of or the collecting of the seismic data utilizing the system of the invention as shown in the drawing. Prior to making conclusions as to locations of structures of interest, the data collected by means of the above steps must be first pre-processed, in order to orientate the data with respect to the geology. That is, to mathematically rotate the horizontal components of the waves received so that one of these horizontal components is positioned in the vertical plane which contains the reproducible shot hole 12, thus making the other horizontal component generally normal to that plane. Such corrections are necessary because the cables 20 and 22 could possibly turn the detector unit 16 as the clamped detector 14 is traversed in hole 10.

The final step is the processing of the data to make a seismogram or seismic map of the area explored. This step is very similar to conventional processing and is well within the expertise of persons skilled in the art. After processing the advantages of the system of the invention, the high coherence of signal and substantial elimination of noise, and the removal of distortions caused by the "plant" or, more accurately, the couple of the detector to the earth, and the fact that all work is done below the weathered and near surface inhomogeneous layers, will result in a high quality seismic data display.

While the invention has been described in detail above, it is to be understood that this detailed description is by way of example only, and the protection granted is to be limited only within the spirit of the invention and the scope of the following claims.

I claim:

1. A method of seismic exploration comprising the steps of clamping detector means in a detector hole below the near surface inhomogeneous layers; firing a charge of predetermined strength at a depth below the near surface inhomogeneous layers in a reproducible shot hole laterally spaced from the detector hole; recording the energy from said charge as returned from deeper strata of interest by said detector means clamped in said detector hole; moving said detector means to a plurality of different depths below the near surface inhomogeneous layers in the detector hole to traverse the detector hole; and at each of said different depths clamping the detector means in said detector hole, firing a charge of predetermined strength at the same depth in said reproducible shot hole and recording the energy from said charge as returned from deeper strata of interest from said detector means in said detector hole.

2. A method as set forth in claim 1 including the step of monitoring the energy received at the surface from the charges.

3. A method as set forth in claim 1 including the steps of firing a cap shot at the surface, and recording energy from the cap shot as returned from the detector means clamped in the detector hole at intervals in the traverse of the detector hole.

4. A method as set forth in claim 1 including the step of testing the coupling of the detector to the wall of the detector hole at each position in the traverse prior to firing the charge.

5. A method as set forth in claim 1 characterized by during the period the charge is fired and energy from the charge is recorded isolating the detectors from vibrations in cable extending up the borehole from the detector means.

* * * * *